United States Patent
Hsiao

(10) Patent No.: US 6,167,931 B1
(45) Date of Patent: Jan. 2, 2001

(54) INFLATION-FREE TIRE STRUCTURE

(75) Inventor: Chai-I Hsiao, Chang-Hua Hsien (TW)

(73) Assignee: Kings Glory Co., Ltd., Chang-Hua Hsien (TW)

( * ) Notice: Under 35 U.S.C. 154(b), the term of this patent shall be extended for 0 days.

(21) Appl. No.: 09/273,978

(22) Filed: Mar. 22, 1999

(51) Int. Cl.[7] ................................. B60C 7/00; B60C 7/22
(52) U.S. Cl. ................................... 152/197; 152/327
(58) Field of Search ..................... 152/310–322, 152/554, 552, 246, 323–329, 300–309, 165, 166, 5, 7, 396, 196, 197, 151, 450, 516, 517, 549; 301/64.4

(56) References Cited

U.S. PATENT DOCUMENTS 2,650,633 * 9/1953 Eger ................................. 152/327

* cited by examiner

Primary Examiner—Adrienne C. Johnstone
(74) Attorney, Agent, or Firm—Bacon & Thomas, PLLC

(57) ABSTRACT

An improved inflation-free tire structure for use on light duty vehicles, such as mowers and wheel chairs, has a crude tire, a pair of wheel discs and a bearing. The crude tire is provided with multiple radial plies that are extended over and wound around the wire beads disposed on inner parallel peripheral rims of a tire and further led to the middle or bottom portion of the rubber side walls of a tire so that the strength of the tire is reinforced. Each wheel disc provided with a flanged rim has a central through hole with four holes disposed on the periphery thereof so as to permit the bearing to be guided through the two wheel discs and fixed in place. The tire has a central hole with which a wheel disc is in snap engagement. The diameter of the rim of the central hole of the tire is smaller than the diameter of the flanged rim of a wheel disc so that the tire can be sealedly engaged with each wheel disc in assembly.

3 Claims, 4 Drawing Sheets

INFLATION-FREE TIRE STRUCTURE

BACKGROUND OF THE INVENTION

The present invention relates to an improved inflation-free tire structure including a crude tire, a pair of wheel discs and a bearing for use on light duty vehicles. The crude tire is provided with additional multiple radial plies that are extended over and wound around the wire beads peripherally disposed the respective inner rims of a tire and further led to the middle or bottom portion of the rubber side walls of a tire so that the strength of the tire is reinforced. Each wheel disc provided with a flanged rim has a central through hole with a plurality of holes, such as four holes disposed on the periphery thereof so as to permit the bearing to be guided through the two wheel discs and fixed in place. The tire has a central hole with which a wheel disc is in snap engagement. The diameter of the rim of the central hole of the tire is smaller than the diameter of the flanged rim so that the tire can be sealedly engaged with each wheel disc.

The inflation-free tire of the present invention is applied to mowers, wheel chairs for the handicapped or vehicles of less carrying loads. It is equipped with a pair of wheel discs engaged with each sides of the tire with a bearing mounted between the wheel discs.

In general, a conventional tire is made up of an outer tire 20 and an inflatable inner tire 21 and a pair of wheel discs 10. Such a prior art tire has the following disadvantages in practical use.
1. It is relatively complicated to assemble the tires and is high in labor cost and wasting of time in practical use.
2. It will deflate immediately on being punctured by a pointed object, resulting in imminent danger in driving.

Referring to FIG. 2, another prior art tire is illustrated in a sectional manner. The tire 20 has a radial ply 21 and a foamed PU block 22 disposed inside the tire 20. This tire 20 has the disadvantages in use.
1. Its production process is complex and is produced at high cost and heavy in weight. The foamed PU material is poisonous and can not be recycled for use, causing serious environment pollution.
2. Water and air will be produced in the foaming process and accumulated in between the foamed PU and the tire 20, so the tire 20 must be punctured on the side wall thereof so as to get water and air released. Such a puncture can damage the radial plies 21 between the tire 20 and the PU foam 22, resulting in sabotage of the tire 20.

SUMMARY OF THE INVENTION

The primary object of the present invention is to provide an improved inflation-free tire structure which has a crude tire made up of a surface layer, a buffer layer and an inner layer that are made of different materials and in various depths. Besides, the multiple radial plies on the rubber side walls of the tire can reinforce the tire and make the tire operated with comfort.

Another object of the present invention is to provide an improved inflation-free tire which is not filled with air so that it is free from the problems of leakage and explosion, making the use of the tire in a safer manner.

One further object of the present invention is to provide an improved inflation-free tire which is reinforced by multiple radial plies so as to make the deformation of the tire reduced when subject to heavy load, resulting in the reduction of contact surface of the tire with ground and prolonging of the operation life of the tire accordingly.

DETAILED DESCRIPTION OF THE PREFERRED EMBODIMENT

Figure 2:
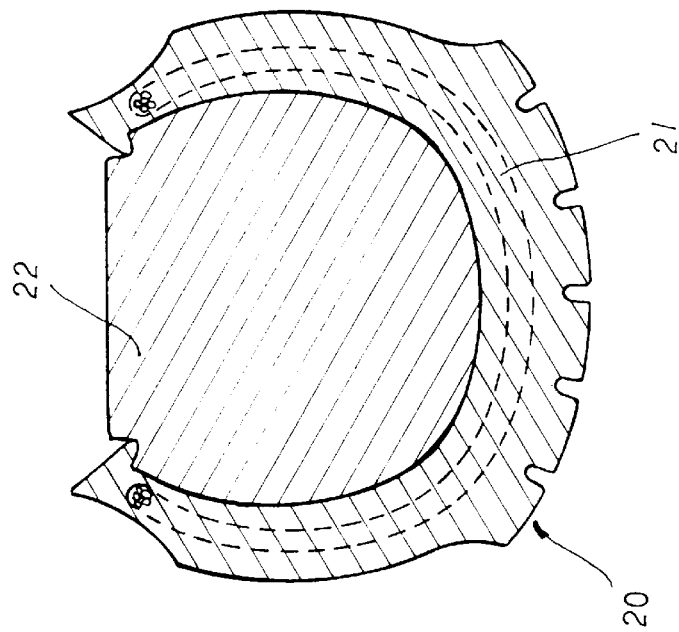
FIG. 2 is a sectional diagram of a conventional inflation-free tire as illustrated in FIG. 1.
Figure 1:
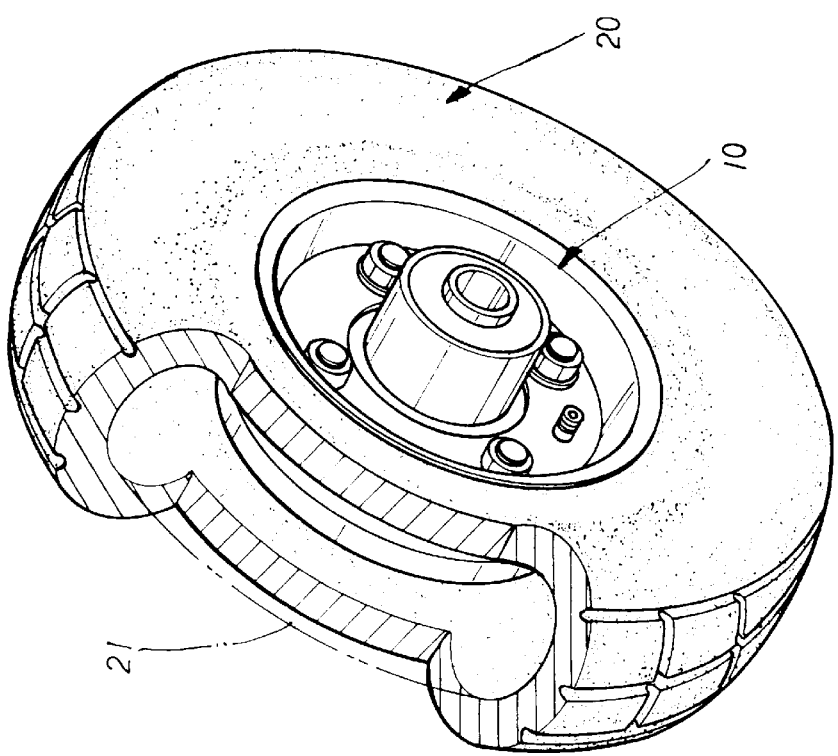
FIG. 1 is a diagram showing a conventional inflation-free tire structure.
Figure 3:
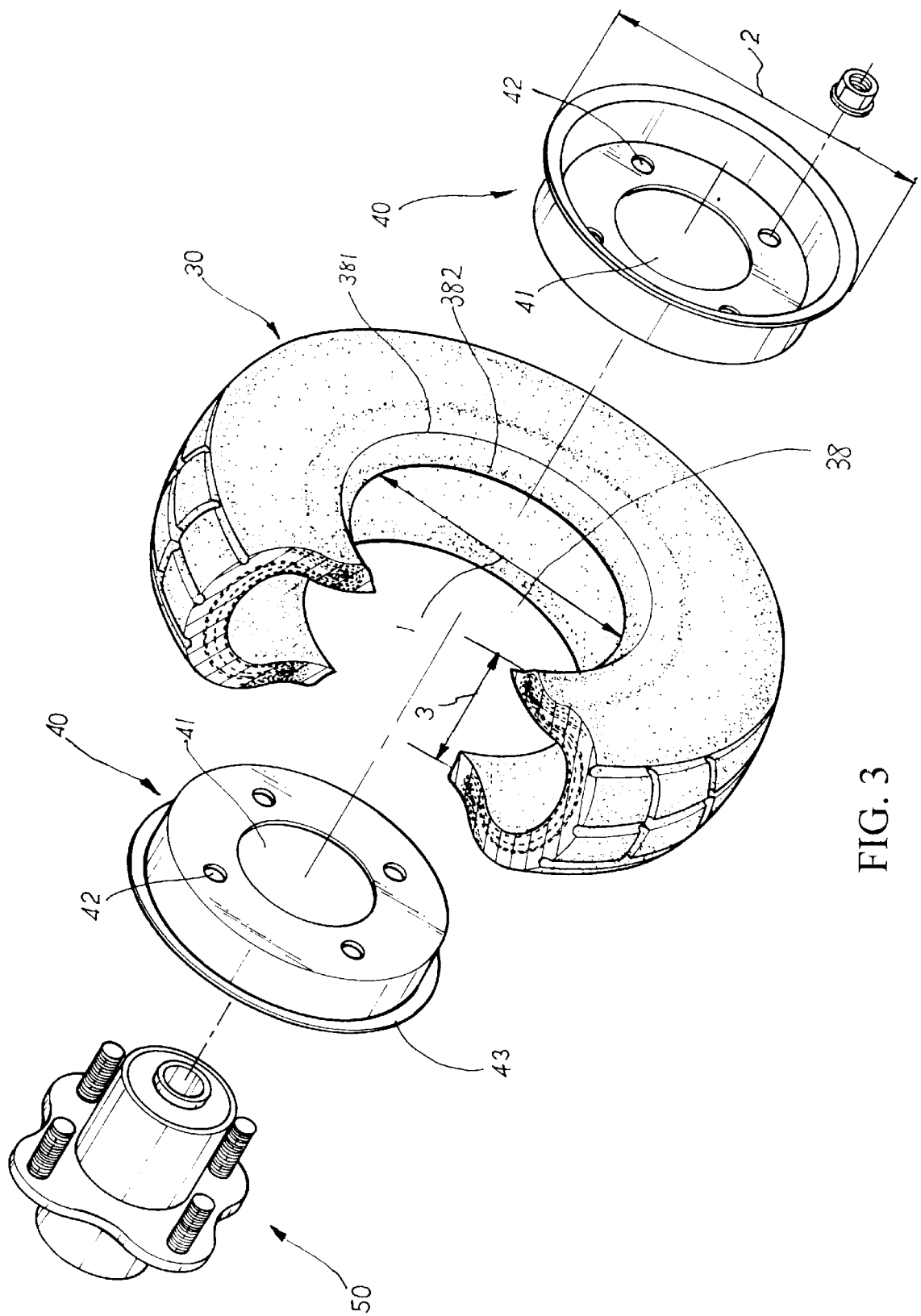
FIG. 3 is a diagram showing the exploded components of the inflation-free tire of the present invention.
Figure 4:
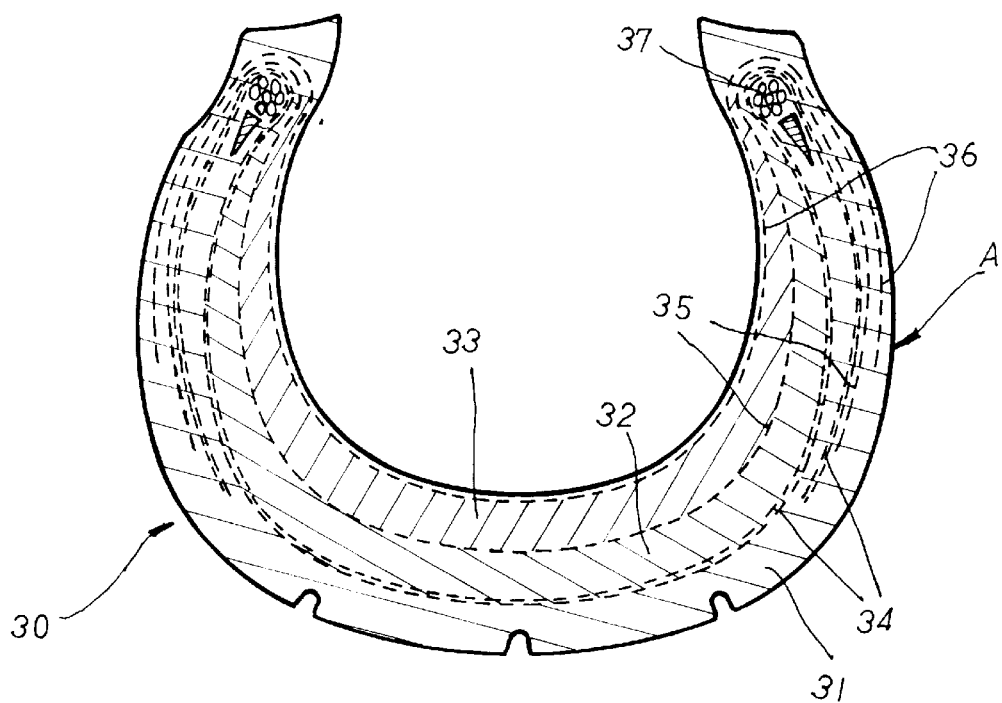
FIG. 4 is a sectional diagram showing the tire structure of the present invention.

Referring to FIGS. 3, 4, the improved tire of the present invention is made up of a crude tire 30, a pair of wheel discs 40 and a bearing 50. The crude tire 30 comprises a superficial layer 31, a hard buffer layer 32 and a super hard inner layer 33 consecutively extended from an outer face toward inner face of the tire with their thickness and hardness of the used rubber materials varied. The superficial layer 31 is designed to make the tire operated in a smooth and comfortable manner. The hard buffer layer 32 is responsible for absorbing small-scale vibration. The super hard inner layer 33 prevents the tire side walls from easy deformation when the tire is subjected to heavy load. An outer radial ply 34 is disposed between the superficial layer 31 and the hard buffer layer 32. A middle radial ply 35 is placed between the hard buffer layer 32 and the super hard inner layer 33. On the inner side of the super hard inner layer 33 is disposed an inner radial ply 36.

Figure 5:
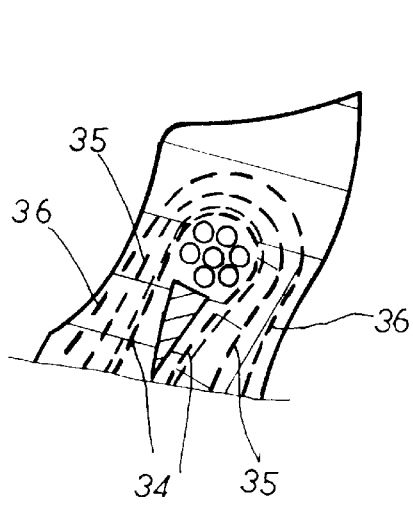
FIG. 5 is a partially enlarged sectional diagram of the present invention.
Figure 6:
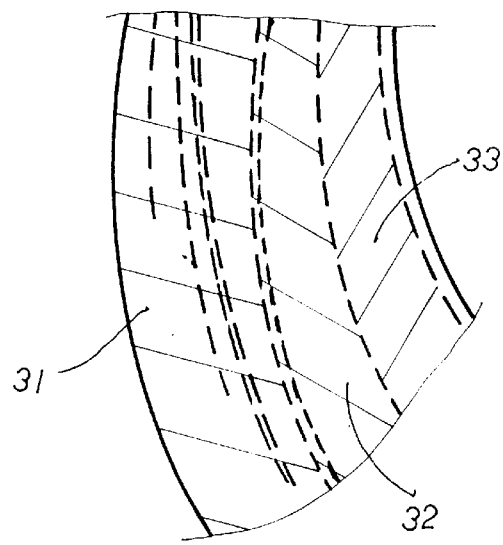
FIG. 6 is a diagram showing a detailed inner structure of the tire of the present invention.

The outer radial ply 34 is led over and wound about the bead wires 37 disposed at each top edge of the tire and is further extended to a lower position of the side walls A of each tire. The middle radial ply 35 is also led over and wound about the bead wires 37 and is extended to a middle position of the side walls A of the tire. The inner radial ply 36 is led over and wound about the bead wires 37 and terminates at the upper position of the side walls A, as shown in FIGS. 4, 5 and 6.

Figure 7:
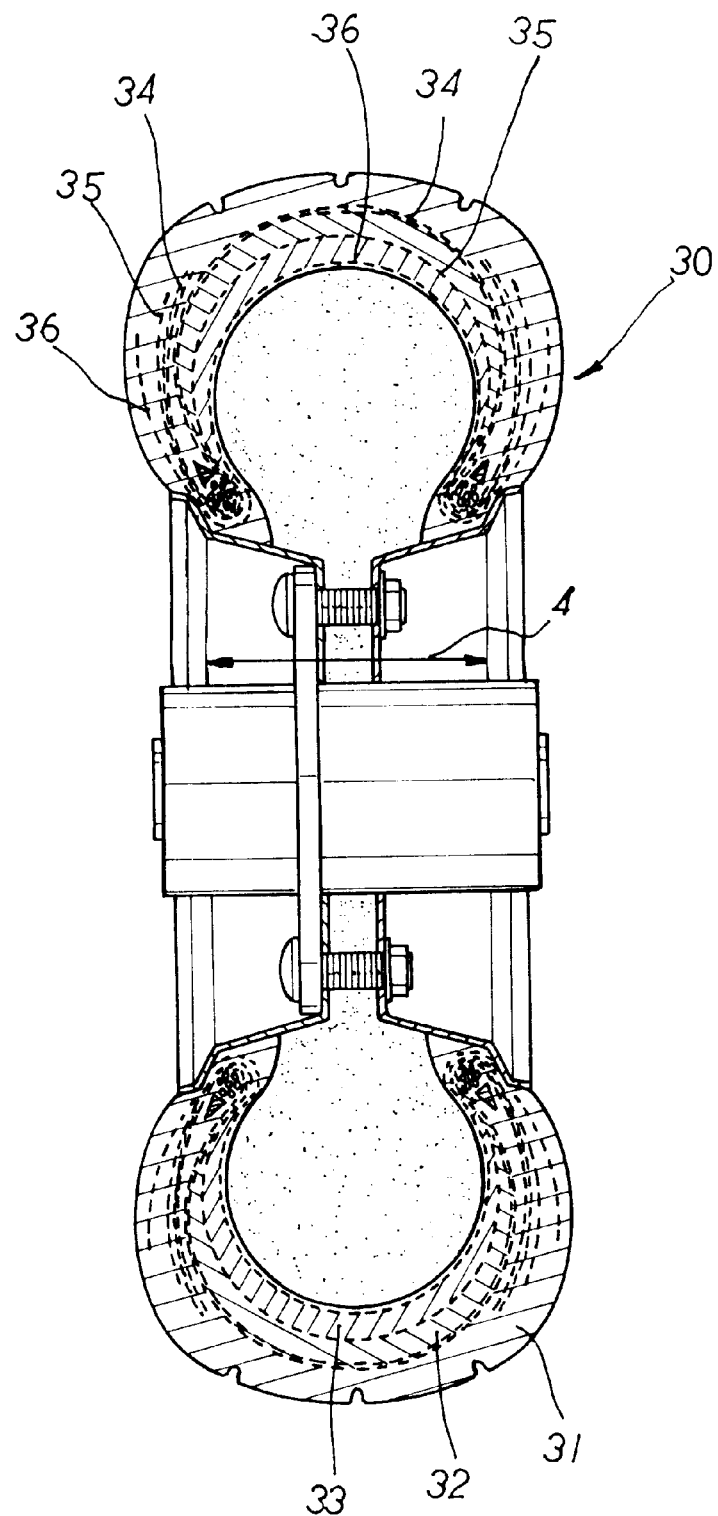
FIG. 7 is a diagram showing the practical application of the tire to a vehicle.

Each wheel disc 40 has a central through hole 41 with 4 through holes 42 symmetrically disposed on the periphery of the central through hole 41 and a flanged rim 43. The inner diameter 1 of the tire is slightly smaller than the diameter 2 of the flanged rim 43 of each wheel disc 40. The width 3 measured from one outer rim 381 to the opposite outer rim 381 of the central hole 38 of the tire 30 is larger than the distance 4 between flanged rims 43 of the two wheel discs 40 that are fixed together by bolts and nuts, as shown in FIGS. 3 and 7. Thereby the tire 30 and the wheel discs 40 and the bearing 50 can be suitably and tightly assembled together.

Respective thickness of the superficial layer 31, the hard buffer layer 32 and the super hard inner layer 33 can be varied according to loading capacity required for an individual layer in the design of said tire.

The central hole 38 of the tire 30 has an inner rim 382 and an outer rim 381 at each side of the tire and each inner rim 382 has a diameter smaller than a diameter of the flanged rim 43 of each wheel disc 30 whereby sealing condition of the tire and the wheel discs can be effectively increased.

The distance measured from one outer rim 381 to an opposite outer rim 381 of the central hole 38 of the tire 30 is larger than a distance measured from the flanged rim 43 of one wheel disc 40 to the flanged rim 43 of another wheel disc 40 when the wheel discs 40 are fixed together by bolts and nuts.

In summary, the advantages of the present invention are apparently given as follows.
1. The strength of a tire is effectively reinforced as a result of the multiple radial plies of the crude tire 30 being led over and wound about the wire beads 37.
2. The tire is inflation free so as to prevent the tire from leakage and explosion in operation.
3. The multiple radial plies of the tire can build up the rubber side walls A of the tire, so the deformation level of the tire can be effectively reduced in operation, resulting in the prolonging of operation life of a tire.

I claim:

1. An inflation-free tire structure for use on light duty vehicles, comprising a crude tire, a pair of wheel discs and a bearing, each said wheel disc having a central hole with a plurality of bolt holes disposed around a periphery of said central hole and said bearing being disposed through said central holes of said wheel discs in assembly, wherein said crude tire includes a superficial layer, a hard buffer layer and a super hard inner layer extending from an outer surface to an inner surface with varied thickness and hardness layer by layer, between said superficial layer and said hard buffer layer is disposed an outer radial ply, a middle radial ply is disposed between said hard buffer layer and said super hard inner layer, and on the inner side of said super hard inner layer is disposed an inner radial ply, said outer radial ply is led over and wound about wire beads disposed at each rim of said crude tire and further extends to a lower position of each side wall of said tire, said middle radial ply is led over and wound about said wire beads and further extends to a middle position of each said side wall of said tire, said inner radial ply is led over and wound about said wire beads and further extends to an upper position of each said side wall of said tire whereby said side walls of said tire are reinforced sufficiently to permit said side walls to sustain heavy loads without easy deformation.

2. The inflation-free tire structure as claimed in claim 1, wherein said central hole of said tire has an inner rim and an outer rim at each side of said tire and each said inner rim has a diameter smaller than a diameter of said flanged rim of each said wheel disc, whereby sealing of said tire and said wheel discs is effectively increased.

3. The inflation-free tire structure as claimed in claim 1, wherein a distance measured from one outer rim to the opposite outer rim of said central hole of said tire is larger than a distance measured from said flanged rim of one said wheel disc to said flanged rim of the other said wheel disc when said wheel discs are fixed together by bolts and nuts.

* * * * *